July 4, 1950        A. J. PETZINGER        2,513,890
PHASE SEQUENCE DEVICE
Filed Nov. 9, 1946        2 Sheets—Sheet 1
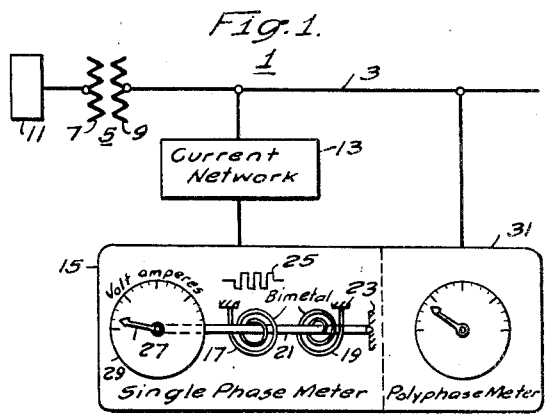
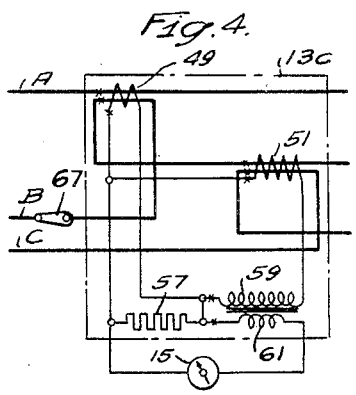
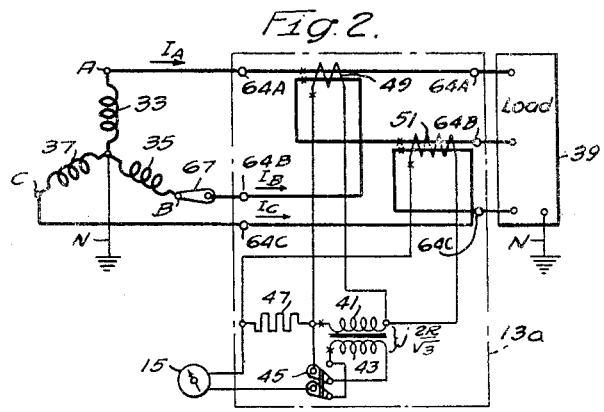
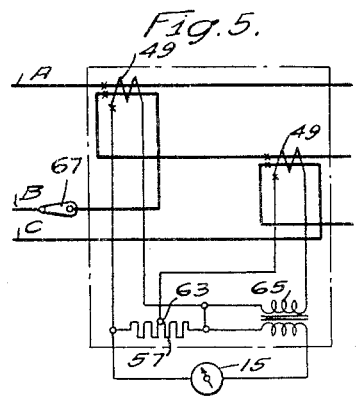
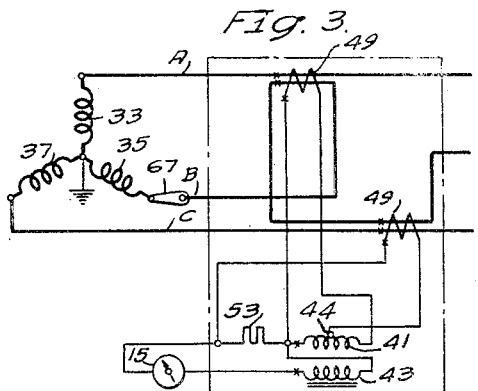
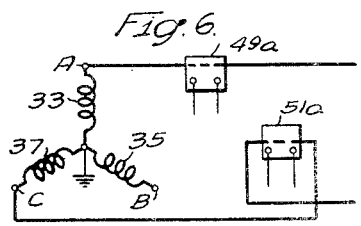
WITNESSES:
INVENTOR
Ambrose J. Petzinger.
BY C. L. Freedman
ATTORNEY July 4, 1950  A. J. PETZINGER  2,513,890
PHASE SEQUENCE DEVICE
Filed Nov. 9, 1946  2 Sheets-Sheet 2
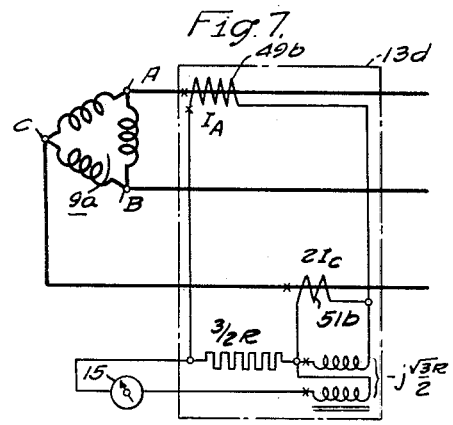
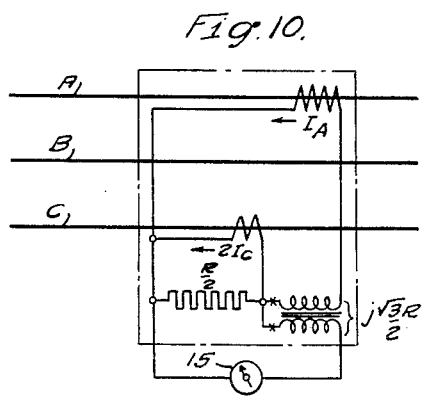
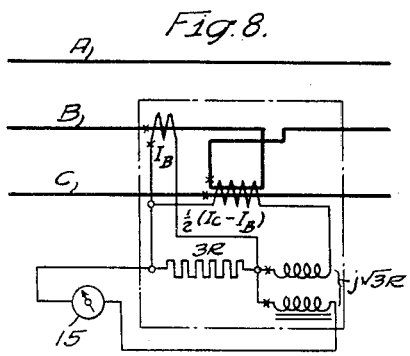
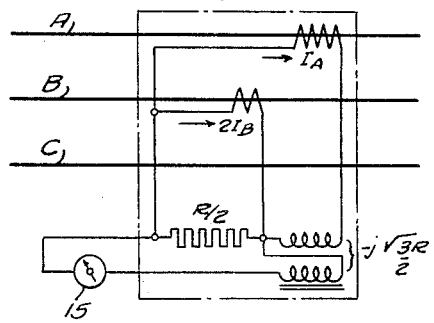
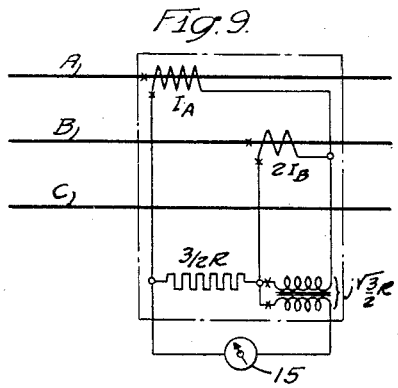
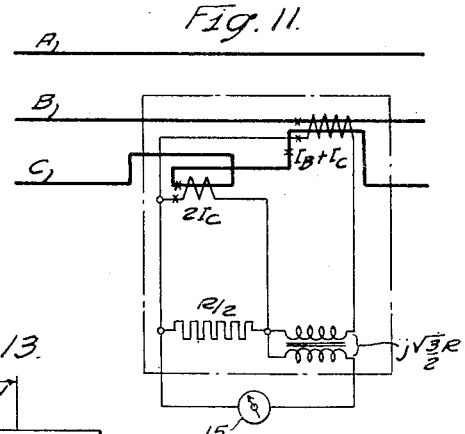
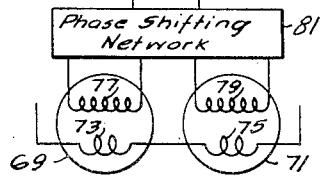
WITNESSES:
E. G. M'Closkey
New C. Groome
INVENTOR
Ambrose J. Petzinger.
BY C. L. Freedman
ATTORNEY Patented July 4, 1950

2,513,890

UNITED STATES PATENT OFFICE 2,513,890

PHASE SEQUENCE DEVICE

Ambrose J. Petzinger, Fair Lawn, N. J., assignor to Westinghouse Electric Corporation, East Pittsburgh, Pa., a corporation of Pennsylvania Application November 9, 1946, Serial No. 709,029

22 Claims. (Cl. 171—34)

This invention relates to phase sequence devices, and it has particular relation to a network suitable for segregating a positive-sequence component of current in a polyphase system for the purpose of measuring volt-amperes in the system.

Sequence networks capable of segregating quantities representing sequence components from polyphase electrical systems are being found increasingly useful for energizing various translating means. As examples of such translating means, reference may be made to relays which are actuated in accordance with sequence components and to measuring means which measure sequence components or a function dependent on one or more sequence components. For the purpose of discussion, the invention will be described with reference to translating means employed for measuring purposes.

The volt-amperes of a polyphase system having voltages which are maintained in balance and equal are proportional to the positive sequence current flowing in the system. Consequently, if a meter such as a conventional thermal demand ammeter is connected for energization in accordance with the positive sequence component of current in such a system, the meter may be calibrated to read directly the volt-ampere demand of the associated system at the aforesaid balanced and equal phase voltages.

A sequence network employed in the aforesaid manner should be not only simple, accurate and compact, but it should operate with high efficiency. For most applications, it is desirable that the network and the meter be enclosed in a common housing. Also heat conductive means usually would connect the network to the associated translating means, which may be a thermal meter. If the network has high losses, a thermal demand meter mounted in the same housing may be subject to errors resulting from the heat generated in the network unless carefully insulated therefrom, or unless adequate heat-dissipation is provided.

In accordance with the invention, a phase sequence network is provided which has a high efficiency and which requires essentially only one two-winding reactor and a resistor. By suitable energization of the reactor and resistor, an output proportional to a phase sequence component may be obtained for energizing any suitable translating means.

The invention further contemplates a phase sequence network wherein each circuit component is a reactance or a resistor. By avoiding a circuit component comprising a mixed resistance and reactance, the adjustment problems are greatly simplified. Further simplification is obtained by energizing the network from current transformers having different transformation ratios.

It is, therefore, an object of the invention to provide a simple and efficient phase sequence network.

It is an additional object of the invention to provide a volt-ampere measuring device energized through an efficient network in accordance with the positive sequence component of current in a polyphase system.

It is another object of the invention to provide a sequence network which is energized through transformers having different transformation ratios.

It is also an object of the invention to provide an efficient sequence network requiring essentially only resistance and mutual inductance.

Other objects of the invention will be apparent from the following description taken in conjunction with the accompanying drawings in which:

Figure 1 is a schematic view in single line of a polyphase system having associated therewith a network and meter equipment embodying the invention;

Figs. 2 to 12 are schematic views of various electrical systems embodying the invention; and Fig. 13 is a schematic view showing a modified measuring system suitable for utilization in any of the systems of Figs. 1 to 12.

Referring to the drawings, Fig. 1 shows a polyphase system 1 which includes a polyphase distribution circuit 3 energized through a polyphase transformer 5 having a primary winding 7 and a secondary winding 9 from a suitable source 11 of polyphase electrical energization. The source 11 preferably is capable of maintaining substantially balanced and equal voltages on a system for all distributions of load and many include suitable regulators for this purpose.

The network 13 is energized from the polyphase circuit 3 for the purpose of segregating therefrom a quantity representing a sequence component of the energization of the distribution circuit 3. In a specific example herein discussed, the network is designed to segregate a quantity representing the positive-sequence current of the distribution circuit 3.

Suitable translating means such as a thermal demand ammeter 15 is connected for energization from the network 13. The meter may be of any desired construction, but as illustrated it contains two spiral bimetallic elements 17 and 19 which are similar in design and which have their outer ends attached to a supporting structure 23. The bimetallic elements 17 and 19 are reversely associated with the shaft 21 in order to make the shaft substantially independent of variations in ambient temperature. Suitable heating means such as a resistor 25 is associated with one of the bimetallic elements 17 for the purpose of heating the element 17 to a temperature greater than that of the element 19. As well understood in the art, a pointer 27 attached to the shaft 21 will move over a scale 29 in accordance with a function of the energization of the resistor 25. Consequently, the scale may be calibrated to indicate at all times the magnitude of the quantity energizing the resistor 25. If the quantity represents positive-sequence current of the distribution circuit 3, and if the voltages of the distribution circuit are maintained substantially equal and in balance, the scale 29 may be calibrated to read directly the volt-amperes of the distribution circuit 3 at a predetermined normal voltage.

If desired, the translating means may include in the same housing a conventional polyphase integrating meter 31 for the purpose of measuring the real or reactive component of the volt-ampere hours in the distribution circuit 3.

The distribution circuit 3 may be of any desired construction. For example, it may be a three-wire three-phase system or a four-wire three-phase system operating at a conventional frequency of sixty cycles per second. Alternately, the circuit 3 may be energized from two legs of a star-connected secondary of the transformer to provide three-wire service. These various connections will be discussed in greater detail below.

In the embodiment of Fig. 2, the secondary winding 9 of Fig. 1 may comprise three phase windings 33, 35 and 37 which are connected in star to provide either three-wire or four-wire service. As shown in Fig. 2, the terminals of the windings 33, 35 and 37 are connected to a load 39 through three conductors A, B and C. The neutral point of the windings is connected to a fourth conductor N which is represented in Fig. 2 by ground.

For segregating a quantity representing a desired sequence component from the energization of the associated polyphase circuit, a network $13a$ is provided which corresponds to the network 13 of Fig. 1. The output of the network 13 is supplied to the meter 15. It will be noted that the network $13a$ includes a reactor having a primary winding 41 and a secondary winding 43. The secondary winding 43 is connected in series through a reversing switch 45 with a resistor 47 across the terminals of the meter 15.

Energizations for the reactor and resistor are derived from two three-winding transformers 49 and 51. The transformer 49 has two primary windings energized respectively in accordance with the currents $I_A$ and $I_B$.

It will be noted that the connections for the two primary windings are reversed relative to each other to provide a resultant secondary current proportional to $I_A - I_B$. The transformer 51 has two primary windings energized respectively with the currents $I_B$ and $I_C$, and connected to provide a secondary winding current output proportional to $I_B - I_C$. The secondary winding of the transformer 49 is connected across the primary winding 41 of the reactor, whereas the secondary winding of the transformer 51 is connected across the resistor and the primary winding 41 of the reactor in series.

The theory underlining the connections illustrated in Fig. 2 may be understood by a brief consideration of sequence components in accordance with the principles which will be found in a standard textbook such as Symmetrical Components by Wagner and Evans published by the McGraw-Hill Book Company of New York city. In accordance with the principles of symmetrical components, the positive-sequence current $I_1$ flowing in a three-phase system may be represented by the equation $$3I_1 = I_A + I_B\left(-\tfrac{1}{2} + j\tfrac{\sqrt{3}}{2}\right) + I_C\left(-\tfrac{1}{2} - j\tfrac{\sqrt{3}}{2}\right) \quad (1)$$

Multiplying Equation 1 by $(-j\omega M)$ the following equation is obtained $$E_M = -j3\omega M I_1 = \omega M\left[-jI_A + I_B\left(\tfrac{\sqrt{3}}{2} + j\tfrac{1}{2}\right) + I_C\left(-\tfrac{\sqrt{3}}{2} + j\tfrac{1}{2}\right)\right] \quad (2)$$

If $R = \sqrt{3}\omega M$ Equation 2 may be converted into the following expression for the voltage $E_M$ applied to the meter $$E_M = -(I_A - I_B)j\omega M + \frac{(I_B - I_C)}{2}(R - j\omega M) \quad (3)$$

In this expression $j$ represents the conventional operator, M represents a mutual inductance and $\omega$ represents the frequency of the polyphase system multiplied by $2\pi$.

It will be observed that the network $13a$ will satisfy Equation 3 if the resistor 47 has a value equal to R, and the mutual reactance between the two windings 41 and 43 is equal to $$j\frac{R}{\sqrt{3}}$$

In order to satisfy the current relations, the ratio of secondary to primary current of the transformer 49 should be twice that of the transformer 51.

With the reversing switch 45 in the position shown in Fig. 2, the voltage across the secondary winding 43 is subtracted from the voltage across the resistor 47, and the output voltage $E_M$ applied to the meter 15 in accordance with the positive-sequence current of the polyphase system. Consequently, if the system voltage is maintained constant the meter 15 may be calibrated to read directly volt-amperes or volt-ampere demand of the polyphase system at such constant voltage. It is assumed that the phase voltages of the polyphase system are maintained equal and balanced for all load conditions.

As previously explained, it is desirable that the network $13a$ have a high efficiency. If the meter 15 is a thermal demand ammeter having a heater resistance $R_H$, it will draw maximum power from the network if the heater resistance has a value $R_H = 2\omega M$. If this condition is fulfilled, the power dissipated in the meter resistance is over thirteen times that dissipated in the resistor 47 under balanced load conditions. It is desirable that the losses in the resistor 47 be low compared to the losses in the heater resistance.

It will be noted that the positive-sequence current $I_1$ in Equation 2 is rotated 90° from the position which it occupies in Equation 1. However, since the meter 15 responds only to the magnitude of the current, such rotation does not affect the reading of the meter. Rotation through an angle other than 90° may be employed, but the 90° rotation represents a preferred embodiment of the invention.

If desired, the output of the network 13a may be adjusted to provide an output proportional to negative-sequence current in the associated system by operation of the reversing switch 45 to its upper position. Such manipulation of switch produces a voltage output represented by the following equation $$E_M = +(I_A - I_B)j\omega M + \frac{(I_B - I_C)}{2}(R + j\omega M) \quad (4)$$

If the currents $I_A$, $I_B$ and $I_C$ in Equation 4 are replaced by their sequence components, it will be found that $E_M$ varies in accordance with the negative-sequence current of the associated system. In such a case, the meter 15 may be calibrated to read negative-sequence current.

Current transformers are required in Fig. 2 which have different transformation ratios. If desired, the network may be modified to employ current transformers having other relative transformation ratios. For example the network may be designed to permit utilization of similar current transformers. Such a modification may be understood by rewriting Equation 3 as follows $$E_M = -(I_A - I_B)j\omega M + (I_B - I_C)\left(\frac{R}{2} - j\frac{\omega M}{2}\right) \quad (5)$$

To satisfy Equation 5, two similar current transformers may be employed, the resistor 47 of Fig. 2 must be halved in value, and a primary center tap must be provided on the primary winding 41. These changes are illustrated in Fig. 3 wherein a resistor 53 is provided which has half the resistance of the resistor 47. A center tap 44 is provided on the winding 41 of the reactor. The secondary winding of the current transformer associated with the conductors A and B again is connected across the primary winding 41. However, the secondary winding of the current transformer associated with the conductors B and C is connected across the resistor 53 and one-half of the primary winding 41. By checking these connections against Equation 5, it will be observed that the embodiment of Fig. 3 completely satisfies Equation 5, and the meter 15 reads in accordance with positive-sequence current of the associated system. If the meter is to be energized in accordance with negative-sequence current, the connections for the secondary winding 43 may be reversed in the manner discussed with reference to Fig. 2. The provision of transformers having different ratios is desirable in many cases to permit standardization or simplification of other components.

In Fig. 4, a network 13c is associated with the conductors A, B and C. This network includes the two current transformers 49 and 51, but the resistor 47, the primary winding 41, and the secondary winding 43 are replaced by a resistor 57, a primary winding 59 and a secondary winding 61 which are somewhat differently related. The relationships between the components of the network 13c may be understood by reference to Equation 1. If it is assumed that $\omega M$ equals $$\sqrt{3R}$$

Equation 1 when transformed into the corresponding voltage, may be written as follows $$E_M = (I_A - I_B)R + \frac{(I_B - I_C)}{2}(R + j\omega M) \quad (6)$$

It will be noted that if the resistor 57 of Fig. 4 has a value R, the mutual reactance between the windings 59 and 61 should be equal to $$j\sqrt{3R}$$

Furthermore, in order to apply to the meter 15 a voltage proportional to positive-sequence current of the associated system, the secondary winding 61 should be so connected to the resistor 57 that the voltage across the secondary winding adds to the voltage across the resistor 57 to produce a resultant voltage applied to the meter 15. Maximum power is obtained from the network when the meter 15 has a resistance equal to 2R.

As explained with reference to Fig. 2, if the connections of the secondary winding 61 are reversed, the meter 15 will be energized in accordance with negative-sequence current as shown by the following equation $$E_M = (I_A - I_B)R + \frac{(I_B - I_C)}{2}(R - j\omega M) \quad (7)$$

If the currents in Equation 7 are replaced by their sequence components, it will be found that $E_M$ varies in accordance with negative-sequence current of the associated system.

The current transformers 49 and 51 of Fig. 4 may be replaced by two identical transformers 49 as shown in Fig. 5 in a manner somewhat similar to that discussed with reference to Fig. 3. The required changes may be indicated by rewriting Equation 6 as follows:

$$E_M = (I_A - I_B)R + (I_B - I_C)\left(\frac{R}{2} + j\frac{\omega M}{2}\right) \quad (8)$$

In order to satisfy Equation 5, the resistor 57 is provided with a center tap 63. In addition, the reactor is provided with a primary winding 65 which cooperates with the secondary winding to provide a mutual reactance equal to $$j\sqrt{\frac{3R}{2}}$$

The secondary winding of the current transformer associated with the conductors A and B is again connected across the resistor 57. The secondary winding of the current transformer 49 associated with the conductors B and C in Fig. 5 is connected across the primary winding 65 and one half of the resistor 57. By comparing Fig. 5 with Equation 8, it will be found that Fig. 5 satisfies the requirements of the equation.

If the current in one of the phase conductors of the system illustrated in Figs. 2, 3, 4 and 5, is equal to zero, the associated network and meter measure the volt-amperes or volt-ampere demand of a three-wire system energized from two legs of the star-connected transformer secondary winding. For example, let it be assumed that the phase conductor B has a switch 67 which may be opened when the associated star-connected transformer winding is to supply a three-wire service. Only one of the primary windings of each of the transformers 49 and 51 is energized and the associated meter 15 correctly indicates the volt-amperes of the three-wire system.

Since only one primary winding of each of the current transformers is employed for the three-wire service, these current transformers may be replaced by two transformers as indicated in Fig. 6. As shown in Fig. 6, two transformers 49a and 51a are employed which correspond to the transformers 49 and 51 of Fig. 2 or 4. Except for omission of one primary winding, each of the current transformers 49a and 51a is similar to the related transformers 49 or 51 of Figs. 2 and 4 and may be employed for energizing the associated network 13a or 13c. If the current transformers 49a and 51a are employed for energizing the networks of Fig. 3 or Fig. 5, it will be understood that the current transformers may have equal transformation ratios.

If it is desired to measure the volt-amperes of a three-phase three-wire system, the embodiments of Figs. 2 and 4 may be simplified. In a three-phase three-wire system, the current flowing in one of the conductors is always equal in magnitude to, and opposed to, the sum of the currents in the remaining phase conductors. For this reason, it is possible to employ two-winding current transformers for measuring the volt-amperes of a three-phase three-wire system.

A three-phase three-wire system is illustrated in Fig. 7, wherein the three conductors A, B and C are energized from a delta-connected secondary winding 9a which corresponds to the secondary winding 9 of Fig. 1. A network 13d is associated with the three-phase system for the purpose of energizing the meter 15 in accordance with the volt-amperes or volt-ampere demand of the three-phase system. The network 13d has two transformers 49b and 51b which correspond to the transformers 49 and 51 and which have transformation ratios dependent on the design of the components of the associated network 13d.

If in Equation 6 each of the currents in turn is replaced by the negative of the sum of the remaining currents, the following equations may be obtained:

$$E_M = -j\omega M I_C + I_A\left(\frac{3R}{2} - j\frac{\omega M}{2}\right) \quad (9)$$

$$E_M = -I_B\left(\frac{3R}{2} - j\frac{\omega M}{2}\right) - I_C\left(\frac{3R}{2} + j\frac{\omega M}{2}\right) \quad (10)$$

$$E_M = j\omega M I_B + I_A\left(\frac{3R}{2} + j\frac{\omega M}{2}\right) \quad (11)$$

Equation 10 may be rewritten as follows:

$$E_M = j\omega M I_B - (I_B + I_C)\left(\frac{3R}{2} + j\frac{\omega M}{2}\right) \quad (10a)$$

or $$E_M = -\frac{1}{2}(I_C - I_B)(3R + j\omega M) - 3RI_B \quad (10b)$$

In a similar manner, each of the currents in Equation 3 may be replaced by its equivalent in terms of the remaining currents with the following results:

$$E_M = -RI_C - I_A\left(\frac{R}{2} + \frac{3}{2}j\omega M\right) \quad (12)$$

$$E_M = I_B\left(\frac{R}{2} + \frac{3}{2}j\omega M\right) + I_C\left(-\frac{R}{2} + \frac{3}{2}j\omega M\right) \quad (13)$$

$$E_M = RI_B + I_A\left(\frac{R}{2} - \frac{3}{2}j\omega M\right) \quad (14)$$

Equation 13 may be rewritten as follows:

$$E_M = (I_B + I_C)\left(\frac{R}{2} + \frac{3}{2}j\omega M\right) - RI_C \quad (13a)$$

or $$E_M = (I_B - I_C)\left(\frac{R}{2} + \frac{3}{2}j\omega M\right) + 3j\omega m I_C \quad (13b)$$

Figures 7 to 12 inclusive are based respectively on Equations 9, 10b, 11, 12, 13a and 14.

Relative values for resistance and reactance and the relative values of the current supplied to the resistor and reactance in each case are indicated in the various figures. It is believed that the relationship between each of the figures and its associated equation will be understood by inspection.

It should be noted that the equations specify certain relationships between the resistance value of the resistor and the mutual reactance value of the mutual reactor employed in each of the networks. If desired, the resistor or the reactor, or both, may be of an adjustable type to permit adjustment of the resistance value or the mutual reactance values after manufacture. This would permit greater tolerance in the selection of resistors and reactors during manufacture.

In the various equations, the currents $I_A$, $I_B$ and $I_C$ are designated. If the network is employed for energizing a current-responsive device, such as the meter 15, the input terminals of the network may be energized from any combination of the currents which have the same relative phase relations. For example, the terminals 64A, 64B and 64C are shown energized respectively by the currents $I_A$, $I_B$ and $I_C$. If desired, these terminals may be energized respectively by the currents $I_B$, $I_C$ and $I_A$ or by the currents $I_C$, $I_A$ and $I_B$. The phase of the output of the network may vary for each of such energizations, but the meter 15 is not responsive to phase. As a further example, in Equation 9, the currents $I_C$ and $I_A$ may be replaced respectively by the currents $I_A$ and $I_B$ or by the currents $I_B$ and $I_C$.

Although equations have been employed for the purpose of illustrating the invention, the subject matter of the equations also may be expressed in terms of vectors. The currents supplied to the network are selected in proper relative phases and in proper relative magnitudes and the impedances of the network components are selected to produce predetermined relative voltages across the resistor and the secondary reactor winding of the network. It will be found that these voltages combine vectorially to produce an output network voltage only for the desired sequence. Since vector procedure is well understood in the art, a detailed vector analysis of the invention is believed to be unnecessary.

In the preceding discussion, it was assumed that the translating device 15 is a current-responsive meter which is calibrated to indicate volt-amperes or volt-ampere demand. Other forms of translating devices may be employed if desired. For example, in Figure 13 two meters 61 and 71 have windings 73 and 75 connected in series for energization from the output of any of the networks illustrated in the drawings. In addition, the meters 69 and 71 have windings 77 and 79 connected for energization through a phase-shifting network 81 in accordance with one of the voltages of the associated system. Since the voltages are assumed to remain equal and in balance, any of the voltages may be employed with a suitable phase-shifting network 81.

For the purpose of discussion, it will be assumed that the voltage $E_{AN}$ of Fig. 2 is employed for energizing the phase-shifting network 81. The phase-shifting network 81 is adjusted to supply to the meter 69 a voltage which is in phase with current energizing the winding 73 when the associated system operates at unity power factor. Under such circumstances, it will be found that if a wattmeter or watthour meter is employed for the meter 69, the meter may be calibrated to read watts or watthours for the associated system.

The phase-shifting network 81 is adjusted further to supply to the winding 79 of the meter 71 a voltage which is in quadrature with the current supplied to the winding 75 when the associated system operates at unity power factor. If it is similar in construction to the meter 69, the meter 71 will then indicate or integrate vars or var-hours for the associated system. Consequently, two single-phase meters 69 and 71 measure the real and reactive power of the associated polyphase system. If the meters 69 and 71 represent the real and reactive power meters described in Patent 2,367,968 the resulting volt-ampere meter then measures the volt-amperes of the associated polyphase system.

Although the invention has been described with reference to certain specific embodiments thereof, numerous modifications are possible falling within the spirit and scope of the invention.

I claim as my invention:

1. In a device designed for energization from a polyphase source of energy, a network having input terminals designed for energization by at least two of three-phase alternating currents $I_A$, $I_B$ and $I_C$, said network including a resistor having a resistance value R and a reactor having a reactance value equal to $$\frac{jR}{\sqrt{3}}$$

connection for directing a current proportional to $(I_B - I_C)$ through the resistor, and connections for directing a current proportional to $$\left(-I_A + \frac{I_B}{2} + \frac{I_C}{2}\right)$$

through the reactor, such currents being weighted to provide voltages across the resistor and the reactor represented by the expressions $$\frac{R}{2}(I_B - I_C) \text{ and } \frac{jR}{\sqrt{3}}\left(-I_A + \frac{I_B}{2} + \frac{I_C}{2}\right)$$

2. In a device designed for energization from a polyphase source of energy, a network having input terminals designed for energization by at least two of three-phase alternating currents $I_A$, $I_B$ and $I_C$, said network including a resistor having a resistance value R and a reactor having a reactance value equal to $$\frac{jR}{\sqrt{3}}$$

and connections connecting the resistor and reactor in series for energization in accordance with the current $(I_B - I_C)$ to provide voltages thereacross represented by the expression $$\frac{(I_B - I_C)}{2}\left(R - \frac{jR}{\sqrt{3}}\right)$$

means for additionally energizing the reactance in accordance with the current $(I_A - I_B)$ to provide a voltage thereacross represented by the expression $$(I_A - I_B)\frac{jR}{\sqrt{3}}$$

and translating means connected to said reactor and resistor for energization in accordance with the resultant voltage $$\frac{(I_B - I_C)}{2}\left(R - \frac{jR}{\sqrt{3}}\right) - (I_A - I_B)\frac{jR}{\sqrt{3}}$$

3. In a device designed for energization from a polyphase source, a network having input terminals designed for energizations by at least two of three-phase alternating currents $I_A$, $I_B$ and $I_C$, said network comprising a resistor having a resistance value R, a mutual reactor having a primary winding and a secondary winding, said windings having a mutual reactance equal in value to $$\frac{jR}{\sqrt{3}}$$

connections connecting the resistor and the primary winding to the input terminals for energization in accordance with a current equal to $$\frac{(I_B - I_C)}{2}$$

connections connecting the primary winding to the input terminals for energization in accordance with a current equal to $(I_A - I_B)$, and translating means connected across the secondary winding and the resistor in series to provide a voltage output to the translating means represented by the expression $$\frac{(I_B - I_C)}{2}\left(R - \frac{jR}{\sqrt{3}}\right) - (I_A - I_B)\frac{jR}{\sqrt{3}}$$

whereby when said network is connected to a star-connected source for energization by currents $I_A$ and $I_C$, the value of the current $I_B$ is zero and the voltage output represents the total three-wire current supplied by said currents $I_A$ and $I_C$ and the neutral of the star-connected source.

4. A device as claimed in claim 3 wherein a voltage-responsive demand meter is connected for energization in accordance with said voltage output, whereby said demand meter represents the volt-ampere demand of a polyphase source having equal and balanced voltages from which the device is energized, said demand meter being calibrated in volt-amperes for a predetermined system voltage.

5. In a device designed for energization from a polyphase source, a network having input terminals designed for energization by at least two of three-phase alternating currents $I_A$, $I_B$ and $I_C$, said network comprising a resistor having a resistance value R, a mutual reactor having a primary winding and a secondary winding, said windings having a mutual reactance equal in value to $$\frac{j2R}{\sqrt{3}}$$

means connecting the resistor and one half of the primary winding to the input terminals for energization in accordance with a current equal to $(I_B - I_C)$, means connecting the primary winding to the input terminals for energization in accordance with a current equal to $(I_A - I_B)$ and means connecting the secondary winding and the resistor in series to provide a voltage output represented by the expression $$(I_B - I_C)\left(R - \frac{jR}{\sqrt{3}}\right) - (I_A - I_B)\frac{j2R}{\sqrt{3}}$$

6. A device as claim in claim 3, wherein translating means are connected for energization in accordance with the voltage output, said translating means constituting a resistance load having a resistance value equal substantially to $$\frac{2R}{\sqrt{3}}$$

7. In a device designed for energization from a polyphase source of energy, a network having terminals designed for energization by three-phase currents $I_A$, $I_B$ and $I_C$, or by the currents $I_A$ and $I_C$ of a star-connected polyphase source arranged for three-wire service in which case $I_B$ has a value of zero, a mutual reactor having a primary winding element and a secondary winding, a resistor element, means connecting one of said elements for energization in accordance with a first pair of said currents, means connecting one of the elements for energization in accordance with a second pair of the currents, and means connecting the resistor element and the secondary winding in series to provide an output voltage, said mutual reactor and said resistor being so proportioned that said voltage output is proportional to positive-sequence current of a polyphase source from which the device is energized.

8. In a device designed for energization from a polyphase source of energy, a network having input terminals designed for energization by at least two of three-phase alternating currents $I_A$, $I_B$ and $I_C$, said network including a resistor having a resistance value R and a reactor having a reactance value equal to $$j\sqrt{3}R$$

and means connecting the resistor and reactor for energization in accordance with the expressions $$R\left(I_A - \frac{I_B}{2} - \frac{I_C}{2}\right) \text{ and } j\frac{\sqrt{3}R}{2}(I_B - I_C)$$

9. In a device designed for energization from a polyphase source of energy, a network having input terminals designed for energization by at least two of three-phase alternating currents $I_A$, $I_B$ and $I_C$, said network including a resistor having a resistance value R and a reactor having a reactance value equal to $$j\sqrt{3}R$$

means connecting the resistor and the reactor in series for energization in accordance with the expression $$\frac{(I_B - I_C)}{2}(R + j\sqrt{3}R)$$

means for additionally energizing the resistor in accordance with the expression $(I_A - I_B)R$, and translating means connected to the reactor and resistor for energization in accordance with the expression $$(I_A - I_B)R + \frac{(I_B - I_C)}{2}(R + j\sqrt{3}R)$$

10. In a device designed for energization from a polyphase source, a network having input terminals designed for energization by at least two of three-phase alternating currents $I_A$, $I_B$ and $I_C$, said network comprising a resistor having a resistance value R, a mutual reactor having a primary winding and a secondary winding, said windings having a mutual reactance equal in value to $$j\sqrt{3}R$$

means connecting the resistor and the primary winding to the input terminals for energization in accordance with a current equal to $$\frac{(I_B - I_C)}{2}$$

means connecting the resistor to the input terminals for energization in accordance with a current equal to $(I_A - I_B)$, and means connecting the secondary winding and the resistor in series to provide a voltage output represented by the expression $$(I_A - I_B)R + \frac{(I_B - I_C)}{2}(R + j\sqrt{3}R)$$

11. A device as claimed in claim 10 wherein a voltage-responsive demand meter is connected for energization in accordance with said voltage output, whereby said demand meter represents the volt-ampere demand of a polyphase source having balanced voltages from which the device is energized, said demand meter being calibrated to read directly a volt-ampere quantity for a predetermined source voltage.

12. In a device designed for energization from a polyphase source, a network having input terminals designed for energization by at least two of three-phase alternating currents $I_A$, $I_B$ and $I_C$, said network comprising a resistor having a resistance value R, a mutual reactor having a primary winding and a secondary winding, said windings having a mutual reactance equal in value to $$j\frac{\sqrt{3}}{2}R$$

means connecting half of the resistor and the primary winding to the input terminals for energization in accordance with a current equal to $(I_B - I_C)$, means connecting the resistor to the input terminals for energization in accordance with a current equal to $(I_A - I_B)$, and means connecting the secondary winding and the resistor in series to provide a voltage output represented by the expression $$(I_A - I_B)R + (I_B - I_C)\left(\frac{R}{2} + j\frac{\sqrt{3}}{2}R\right)$$

13. A device as claimed in claim 10 wherein translating means are connected for energization in accordance with the voltage output, said translating means presenting a resistance load to the voltage output having a resistance value equal substantially to 2R.

14. In a device responsive to a symmetrical component of polyphase quantities, a resistor element, a mutual reactor having a primary winding element and a secondary winding, circuit means for connecting said primary winding element and said resistor element in series for a first energization from a first source of current, circuit means for connecting one of said elements for a second energization from a second source of current, translating apparatus, and connections connecting the translating apparatus across the resistor and the secondary winding in series.

15. A device as claimed in claim 14 wherein said sources of current comprise current transformers having secondary windings for energizing the elements, said current transformer having primary windings which may be connected in the conductors of a polyphase system for energizing the translating apparatus in accordance with the positive-sequence current flowing in the polyphase system, said translating apparatus comprising a current-responsive measuring instrument calibrated to indicate directly the volt-amperes of the system at a predetermined system voltage.

16. In a device responsive to a symmetrical component of polyphase currents, a resistor element, a mutual reactor having a primary winding element and a secondary winding, a first current transformer having a secondary winding connected to said elements in series, a second current transformer having a secondary winding connected for directing current through only one of the elements, said second current transformer having a ratio of secondary to primary current which is twice the corresponding ratio of the first current transformer.

17. In a device responsive to a symmetrical component of polyphase currents, a resistor element, a mutual reactor having a secondary winding and having primary winding means, translating means, connections connecting the translating means across the resistor and the secondary winding for energization by the series voltage across the resistor and the secondary winding, and connections comprising current transformers for energizing the resistor element and the primary winding means from currents flowing in a polyphase source of energy to give said series voltage a value representing a predetermined current sequence component of the polyphase source.

18. A device as claimed in claim 17 wherein the current transformers comprise a plurality of transformers having different transformation ratios.

19. In a device responsive to a symmetrical component of polyphase quantities, a resistor element, reactive means providing a mutual impedance, said reactive means having a primary winding element and a secondary winding, first and second source means energizable from a polyphase system, first circuit means connecting at least part of said primary winding element and at least part of said resistor element for energization in series from said first source means, second circuit means connecting a first one of said elements for energization from the second source means, and translating means responsive to the resultant voltage across said resistor element and the secondary winding, the ratio of the component of the resultant voltage due to energization of the first one of said elements from the second source means relative to the component of the resultant voltage due to energization of the first one of said elements by the first source means being twice the ratio of the energizations of the corresponding source means.

20. In a device responsive to a symmetrical component of polyphase quantities, a resistor element, reactive means providing a mutual impedance, said reactive means having a primary winding element and a secondary winding, first and second source means energizable from a polyphase system, first circuit means connecting at least part of said primary winding element and at least part of said resistor element for energization in series from said first source means, second circuit means connecting a first one of said elements for energization from the second source means, and translating means responsive to the resultant voltage across said resistor element and the secondary winding, the ratio of the component of the resultant voltage due to energization of the first one of said elements from the second source means relative to the component of the resultant voltage due to energization of the first one of said elements by the first source means being twice the ratio of the energizations of the corresponding source means, said translating means comprising a voltage-responsive demand meter, the ratio of the mutual impedance to the resistance of said resistor and the polarities of said resistor and mutual impedance being selected for energizing the demand meter in accordance with the positive-sequence current component of a polyphase system from which the source means are energized.

21. In a device responsive to a sequence component of a three-phase, three-wire electrical system, a mutual reactor having a primary winding element and a secondary winding, a resistor element, means connecting the primary winding element and the resistor element in series for energization in accordance with a first phase current of the system, means connecting one of the elements for energization in accordance with a second phase current of the system, translating means, and means connecting the resistor element and the secondary winding in series across the translating means for energizing the translating means, said resistor element and the reactor being proportioned to derive from the phase currents an output for the translating means which corresponds to a current sequence component of the system.

22. A device as claimed in claim 21 wherein current transformers are provided for energizing the elements in accordance with said phase currents, said current transformers having different ratios of transformation.

AMBROSE J. PETZINGER.

REFERENCES CITED

The following references are of record in the file of this patent:

UNITED STATES PATENTS

| Number | Name | Date |
| --- | --- | --- |
| 1,674,477 | May | June 19, 1928 |
| 1,752,947 | Genkin | Apr. 1, 1930 |
| 1,963,195 | Friedlander | June 19, 1934 |

Certificate of Correction

Patent No. 2,513,890                                                                         July 4, 1950

AMBROSE J. PETZINGER

It is hereby certified that error appears in the printed specification of the above numbered patent requiring correction as follows:

Column 4, line 23, for "$R=\sqrt{3\omega M}$" read $R=\sqrt{3}\omega M$; column 5, line 68, for "$\sqrt{3R}$" read $\sqrt{3}R$; column 6, line 4, for "$j\sqrt{3R}$" read $j\sqrt{3}R$; lines 40 and 41, for $$"j\sqrt{\frac{3R}{2}}" \quad \text{read} \quad j\frac{\sqrt{3}R}{2}$$

column 11, line 21, for "$j\sqrt{3R}$" read $j\sqrt{3}R$; lines 26 and 27, for $$"j\frac{\sqrt{3R}}{2}" \quad \text{read} \quad j\frac{\sqrt{3}R}{2}$$

and that the said Letters Patent should be read as corrected above, so that the same may conform to the record of the case in the Patent Office.

Signed and sealed this 12th day of December, A. D. 1950.

[SEAL]

THOMAS F. MURPHY,
*Assistant Commissioner of Patents.*